(12) United States Patent
Goettker

(10) Patent No.: US 6,983,999 B2
(45) Date of Patent: Jan. 10, 2006

(54) COVER ASSEMBLY FOR A WHEEL HUB

(76) Inventor: Bernhardt P. Goettker, 14195 Ridge Canyon Rd., Valley Center, CA (US) 92082

( * ) Notice: Subject to any disclaimer, the term of this patent is extended or adjusted under 35 U.S.C. 154(b) by 0 days.

(21) Appl. No.: 10/767,898

(22) Filed: Jan. 28, 2004

(65) Prior Publication Data

US 2005/0162000 A1    Jul. 28, 2005

(51) Int. Cl.
   *B60B 27/00*   (2006.01)
(52) U.S. Cl. .................. 301/108.4; 301/108.1
(58) Field of Classification Search .. 301/108.1–108.5, 301/37.26, 37.27, 37.371; 184/5.1, 45.1, 184/45.2
   See application file for complete search history.

(56) References Cited

U.S. PATENT DOCUMENTS

| | | | | |
|---|---|---|---|---|
| 3,177,041 | A | * | 4/1965 | Isenbarger ............... 301/108.2 |
| 3,316,022 | A | * | 4/1967 | Isenbarger ............... 301/108.2 |
| 4,073,540 | A | * | 2/1978 | Jackowski ............... 301/108.3 |
| 4,190,133 | A | * | 2/1980 | Ploeger ..................... 184/5.1 |
| 5,054,859 | A | * | 10/1991 | Goettker ................. 301/108.1 |
| 5,505,525 | A | * | 4/1996 | Denton .................... 301/108.4 |
| 5,551,530 | A | * | 9/1996 | Goettker .................. 184/45.2 |
| 5,584,359 | A | * | 12/1996 | Reinersman ................ 184/5.1 |

OTHER PUBLICATIONS

"Turbo Lube Hub Kit Instructions", Tie Down Engineering, Inc., prior to Sep. 26, 2003.
"Turbo Lube Hub Kits", Tie Down Engineering, Inc., May 13, 2003.
"K71-038-00 Oil Cap, O-Ring & Plug Kit", Dexter Axel Company, prior to Sep. 26, 2003.

* cited by examiner

*Primary Examiner*—Russell D. Stormer
*Assistant Examiner*—Jason R. Bellinger
(74) *Attorney, Agent, or Firm*—Rodney F. Brown

(57) ABSTRACT

A cover assembly is provided for a wheel hub, which includes a coupler and a cap. The coupler has a forward segment with a coupler forward opening and a coupler rearward segment with a coupler rearward opening. The cap has a cap opening, a cap barrel, and a cap end plate. The coupler rearward segment is configured for connection to a wheel hub, while the cap is configured for connection to the coupler forward segment and for selectively removable coverage of the coupler forward opening. The cap barrel has a first threaded surface and the coupler forward segment has a second threaded surface, which are selectively engagable to enable threadable connection of the cap to the coupler forward segment. The coupler rearward segment has a smooth engagement surface capable of press fitting connection to the wheel hub.

14 Claims, 3 Drawing Sheets

COVER ASSEMBLY FOR A WHEEL HUB

TECHNICAL FIELD

The present invention relates generally to a hub-spindle assembly for a wheel and associated axle, and more particularly to a hub-spindle assembly having a hub filled with a liquid lubricant, wherein the hub is fitted with a cover assembly to retain the liquid lubricant therein.

BACKGROUND OF THE INVENTION

A hub-spindle assembly for a rotatable wheel and associated stationary axle typically includes a hub, a spindle and a plurality of wheel bearings. The hub is a mount for the rotatable wheel and encloses a rotation chamber, which houses the wheel bearings. The spindle extends from the end of the axle and is received into the rotation chamber. The hub and wheel rotate about the spindle during rotational operation of the wheel. The wheel bearings are positioned between the spindle and hub within the rotation chamber to provide a friction-reduced rotation surface. The rotation chamber also contains a viscous lubricant to lubricate the wheel bearings.

A chamber opening is formed in the front of the hub to access the rotation chamber. It is often desirable to access the rotation chamber during maintenance of the hub, for example, when inspecting, servicing, or replacing the lubricant or wheel bearings within the rotation chamber. A bearing cap is typically provided over the chamber opening during rotational operation of the wheel to seal the rotation chamber from the external environment and specifically to prevent the intrusion of contaminants into the rotation chamber, such as grit or moisture. Such contaminants can damage or accelerate wear of the wheel bearings, thereby diminishing the life of the wheel bearings and necessitating frequent replacement, or in some cases causing failure of the hub-spindle assembly with potentially catastrophic results.

The above-described hub-spindle assembly is conventional to virtually all types of conveyances employing wheels and axles, including motor vehicles and trailers. In addition, petroleum-based grease lubricants are the most common type of lubricants used in such hub-spindle assemblies. Despite the widespread use of grease lubricants, however, it is generally known that liquid lubricants are more effective lubricating agents than grease lubricants in hub-spindle assemblies. Liquid lubricants exhibit improved heat transfer properties relative to grease lubricants, thereby more effectively transferring heat away from the wheel bearings of the hub-spindle assembly during operation. In addition, commercial-grade liquid lubricants usually contain a lower level of particulates than commercial-grade grease lubricants. Consequently, a hub-spindle assembly lubricated with a liquid lubricant advantageously tends to exhibit a slower rate of wear than one lubricated with a grease lubricant under equivalent operating conditions.

Grease lubricants are used in hub-spindle assembly applications although liquid lubricants have superior performance characteristics because liquid lubricant-containing hubs are operationally more problematic than grease lubricant-containing hubs. The bearing cap for a grease lubricant-containing hub is typically retained in place over the chamber opening during operation of the wheel by press fitting the smooth-edged bearing cap onto the correspondingly smooth-edged circular chamber opening. The bearing cap cannot be press fitted onto the chamber opening too tightly since it is periodically necessary to remove the bearing cap for wheel maintenance purposes, such as servicing the lubricant. The press-fitted bearing cap is removed from the chamber opening by manually prying the bearing cap away from the chamber opening with a screw driver, chisel, pry bar, or the like when it is necessary to access the interior of the rotation chamber. However, the press-fitted bearing cap is usually formed from a more lightweight material, which is not as sturdy as the heavier material from which the hub is formed. Thus, the bearing cap is not press fitted too tightly onto the chamber opening to prevent damage to the bearing cap during placement or removal.

Press-fitted bearing caps are not readily adaptable to liquid lubricant applications because the less viscous liquid lubricants are more prone to leakage past press-fitted bearing caps than the more viscous grease lubricants. As noted above, the need to periodically manually remove the press-fitted bearing cap from the hub often results in an incomplete seal between the press-fitted bearing cap and hub, which is not fluid-tight. Press-fitted bearing caps are also susceptible to water intrusion either during inactivity or during rotational operation of the wheel. Although liquid lubricants and grease lubricants are both petroleum-based, liquid lubricants are much less effective than grease lubricants when contaminated with water. Water forms emulsions with liquid lubricants, whereas water does not readily mix with grease lubricants because of the lower viscosity of liquid lubricants relative to grease lubricants. As a result, grease lubricants retain their effectiveness to a greater degree in the presence of water than liquid lubricants which quickly break down.

Hubs which are specifically designed for liquid lubricant applications typically have threads on the chamber opening, which are coupled with corresponding threads on the bearing cap. Threadably-coupled bearing caps and hubs are much less susceptible to liquid lubricant leakage and water intrusion than press-fitted bearing caps and hubs. Nevertheless, many conventional hubs are still designed for press-fitted bearing caps. Such hubs lack threads on the chamber opening to accommodate threads on the bearing cap so that only press-fitted bearing caps and grease lubricants can be used with the hubs. Consequently, the advantages of liquid lubricants go unrealized for these hubs.

If it becomes necessary or desirable to use liquid lubricants in a conventional hub lacking a threaded chamber opening, it is usually necessary to replace the entire unthreaded hub with a new threaded hub. This procedure is both time consuming and costly. Accordingly, it is an object of the present invention to provide means for practically and economically converting a grease lubricant-containing hub to a liquid lubricant-containing hub. More particularly, it is an object of the present invention to provide a cover assembly for an unthreaded chamber opening of a hub, which effectively retains a liquid lubricant in the rotation chamber of the hub. It is another object of the present invention to provide a cover assembly for a chamber opening of a hub, which is resistant to intrusion of water or other contaminants into the rotation chamber of the hub. It is a further object of the present invention to provide a cover assembly for a chamber opening of a hub, which enables visual inspection of a liquid lubricant within the rotation chamber of the hub without removal of the cover assembly. It is still a further object of the present invention to provide a cover assembly for a chamber opening of a hub, which readily enables the addition of a liquid lubricant into the rotation chamber of the hub without removal of the cover assembly. It is yet a further object of the present invention to provide a cover assembly for a chamber opening of a hub, which provides ready access to the rotation chamber of the hub for servicing the wheel bearings therein. It is another object of the present invention to provide a cover assembly for a chamber opening of a hub, which is sufficiently sturdy to withstand the rigors of everyday operation. These objects and others are accomplished in accordance with the invention described hereafter.

SUMMARY OF THE INVENTION

The present invention is a cover assembly for a wheel hub. The cover assembly comprises a coupler and a cap. The coupler has a forward segment with a coupler forward opening and a coupler rearward segment with a coupler rearward opening. The cap has a cap opening, a cap barrel, and a cap end plate. The coupler rearward segment is configured for connection to a wheel hub, while the cap is configured for connection to the coupler forward segment and for selectively removable coverage of the coupler forward opening.

In accordance with one embodiment, the cap barrel has a first threaded surface and the coupler forward segment has a second threaded surface. The first and second threaded surfaces are selectively engagable to enable threadable connection of the cap to the coupler forward segment. The cap barrel may be received into the coupler forward segment or alternatively the coupler forward segment may be received into the cap barrel. In a preferred embodiment, the coupler forward segment is received into the cap barrel with the first threaded surface being an internal surface of the cap barrel and the second threaded surface being an external surface of the coupler forward segment.

The coupler rearward segment preferably has a smooth engagement surface capable of press fitting connection to the wheel hub with the coupler rearward segment being receivable into the wheel hub. In accordance with a more specific embodiment, the cap end plate has a cap opening and a selectively removable cap plug is positioned in the cap opening. In accordance with another more specific embodiment, the coupler forward segment and the coupler rearward segment are separated by a flange having a beveled edge.

The above-recited coupler is preferably an element of a hub-spindle assembly for a rotatable wheel. In addition to the coupler, the hub-spindle assembly further comprises a wheel hub and a wheel bearing. The wheel hub has a hub chamber and a hub forward opening. The wheel bearing is positioned in the hub chamber.

The cap barrel has a first threaded surface and the coupler forward segment has a second threaded surface. The first and second threaded surfaces are selectively engagable to enable threadable connection of the cap to the coupler forward segment with the coupler forward segment preferably being received into the cap barrel. The coupler rearward segment has a smooth engagement surface for press fitting into the hub chamber via the hub forward opening.

The present invention is additionally a method for covering an unthreaded forward opening of a hub chamber of a wheel hub with a threaded cap. The method comprises press fitting a coupler rearward segment of a coupler having a coupler rearward opening into an unthreaded forward opening of a hub chamber of a wheel hub. A threaded cap is provided having a cap opening, a cap barrel with a first threaded surface, and a cap end plate. The first threaded surface of the cap barrel is threadably connected to a second threaded surface of a coupler forward segment. The coupler has a coupler forward opening with the cap selectively removably covering the coupler forward opening and correspondingly covering the unthreaded forward opening of the hub chamber. The coupler rearward segment has a smooth engagement surface press fitted into the unthreaded forward opening.

The present invention will be further understood from the drawings and the following detailed description.

DESCRIPTION OF PREFERRED EMBODIMENTS

Figure 1:
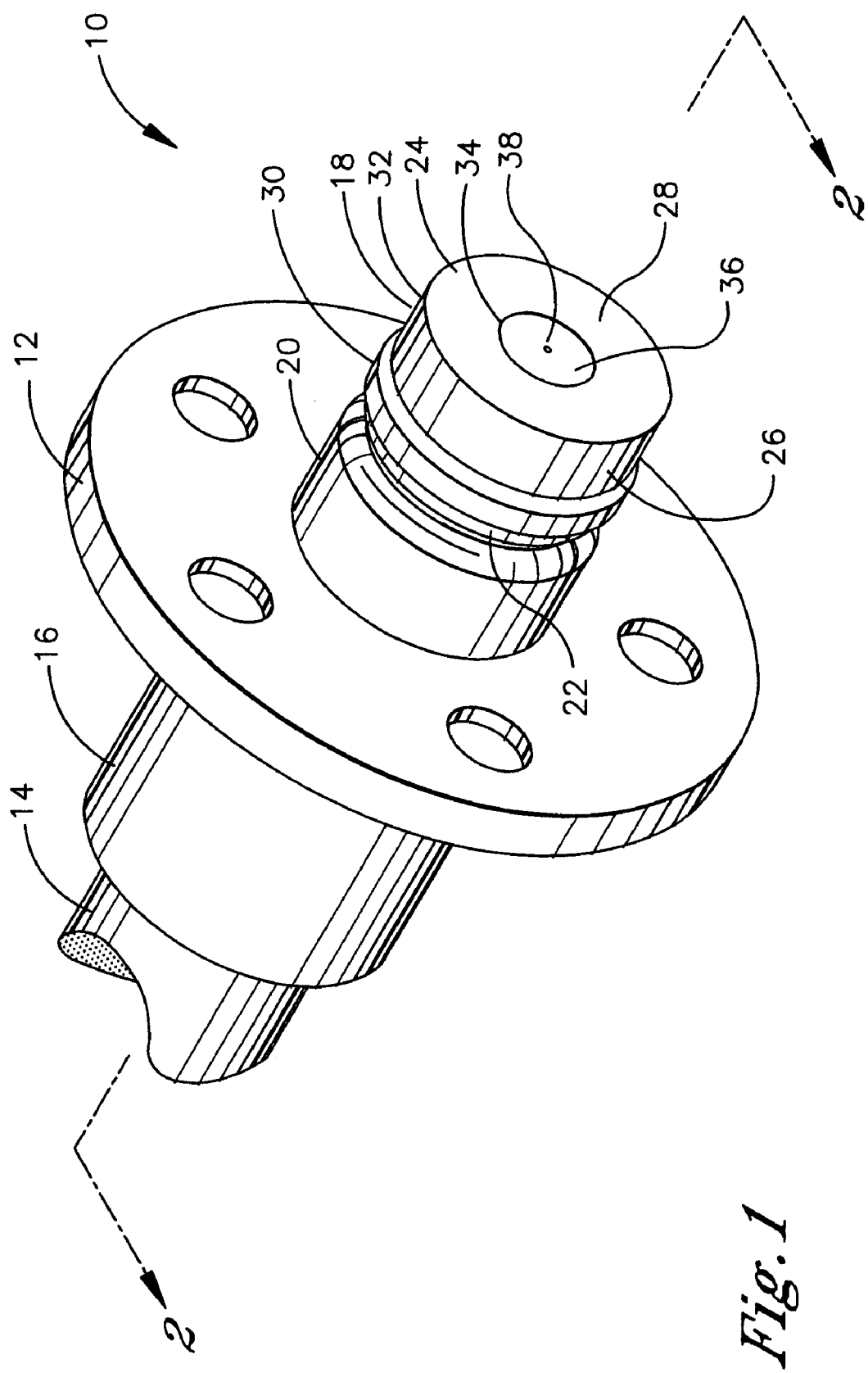
FIG. 1 is a perspective view of a hub-spindle assembly and an associated cover assembly of the present invention.

Referring to FIG. 1, a hub-spindle assembly is shown and generally designated 10. The hub-spindle assembly 10 comprises a hub 12 and a spindle 14, which are similar to those disclosed in U.S. Pat. No. 5,551,530, incorporated herein by reference. The spindle 14 is a shaft having an end rearwardly extending away from the hub 12 to engage an axle (not shown), which supports the spindle 14. The hub 12 is constructed in the typical manner of a conventional grease lubricant-containing hub. In particular, the hub 12 has a substantially tubular configuration with an open interior to receive a forwardly-extending end of the spindle 14 via the hub rear 16 as described below. The hub 12 functions as a mount for a wheel (not shown) and the spindle 14 functions as an axis of rotation for the hub 12 and the wheel mounted thereon.

A cover assembly 18 engages the hub front 20. The cover assembly 18 comprises a coupler 22 and a bearing cap 24. The coupler 22 likewise has a tubular configuration as described below. The bearing cap 24 fits over the open front end (shown in FIGS. 2 and 3) of the coupler 22. The bearing cap 24 has a cylindrical configuration, which includes a cap barrel 26 and a cap end plate 28. The cap barrel 26 has a cap rearward end 30 and a cap forward end 32. The cap rearward end 30 is open and the cap forward end 32 is covered by the cap end plate 28. The cap barrel 26 and cap end plate 28 are preferably integrally constructed as a unitary structure from a rigid, strong material having transparent properties, such as a light-weight, transparent plastic, and more particularly a molded polycarbonate plastic. The term "transparent" as used herein refers to materials that are substantially clear or translucent, to the extent a liquid lubricant is visible therethrough. The hub 12, spindle 14, and coupler 22 are preferably fabricated from strong, heavy-weight, durable metals such as cast iron or steel.

A cap opening 34 is formed in the cap end plate 28 and a cap plug 36 resides in the cap opening 34. The cap plug 36 is removably retained in the cap opening 34, preferably by press fitting, to form a fluid-tight seal at the interface between the cap opening 34 and the cap plug 36. The cap plug 36 is preferably fabricated from a somewhat flexible elastomeric material, such as a stiffened synthetic rubber, and has a relatively small pressure vent port 38 extending therethrough.

Figure 2:
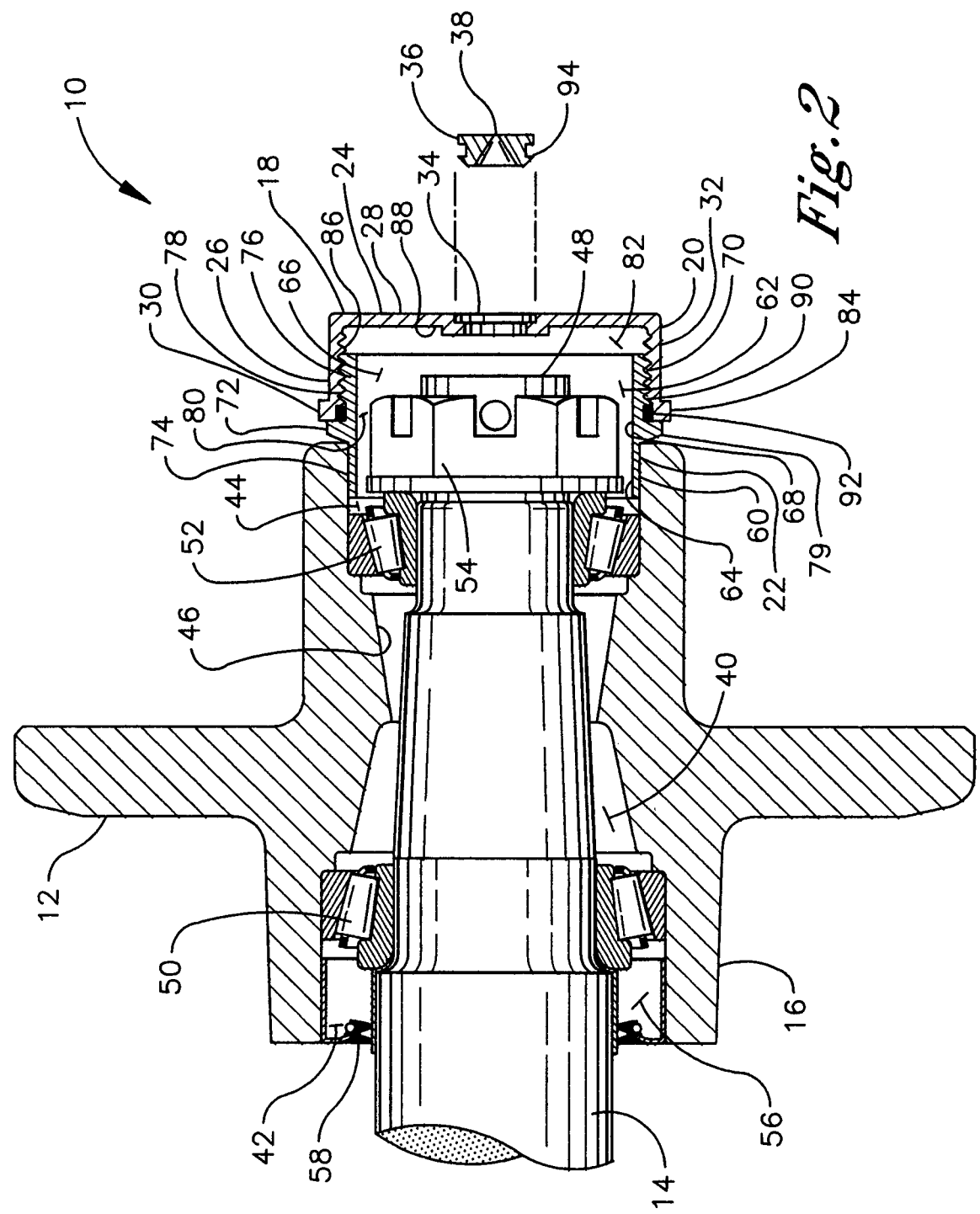
FIG. 2 is an elevational view in partial cross-section of the hub-spindle assembly and cover assembly of FIG. 1 taken along line 2—2.
Figure 3:
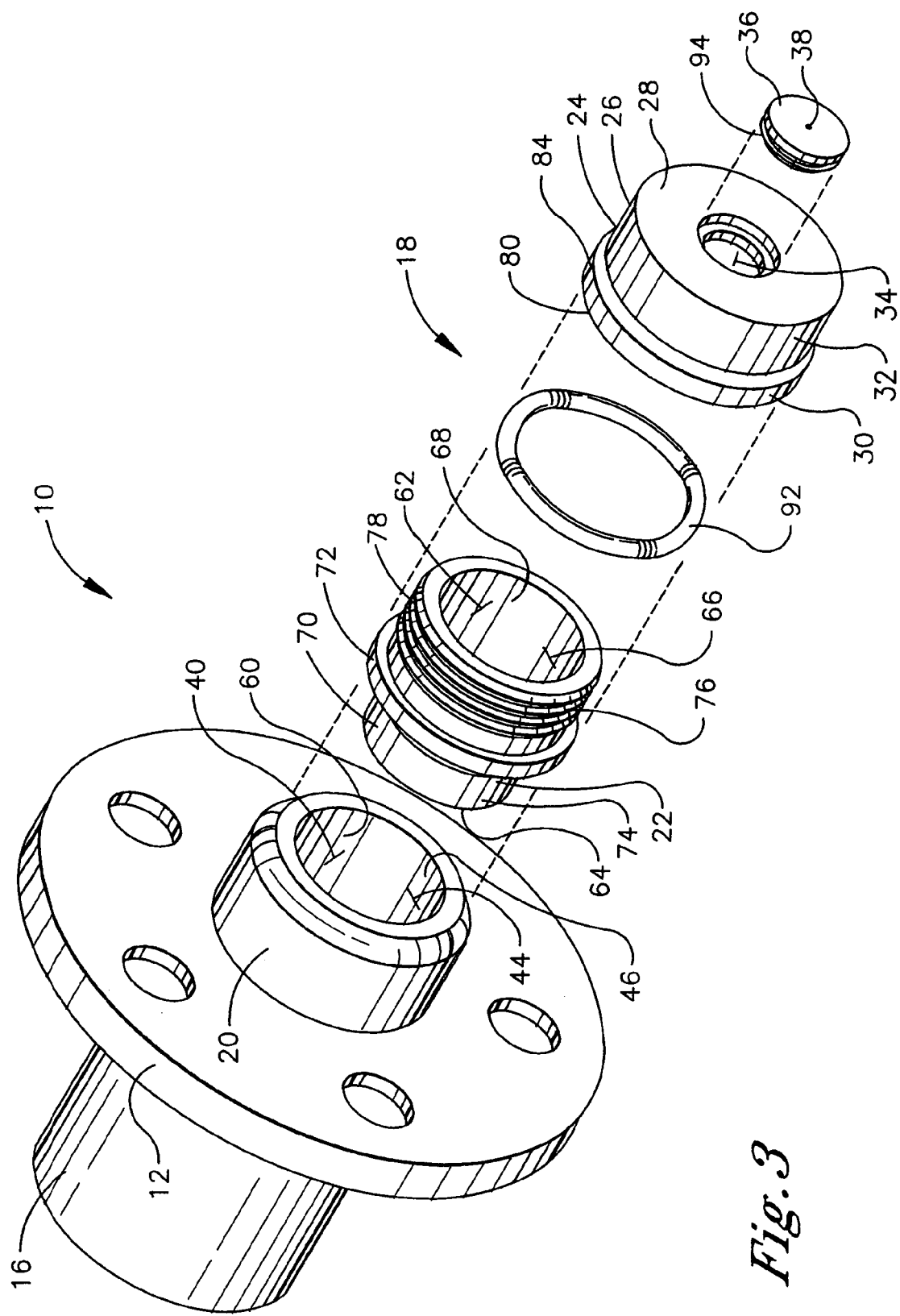
FIG. 3 is an exploded perspective view of the cover assembly of FIG. 1.

Further details of the hub-spindle assembly 10 and cover assembly 18 are shown and described hereafter with reference to FIGS. 2 and 3. Elements of FIGS. 2 and 3, which are common to FIG. 1, are identified by the same reference characters. As disclosed above, the hub 12 has a tubular configuration, which defines a rotation chamber 40 (alternately termed a hub chamber), a hub rearward opening 42, and a hub forward opening 44. The hub chamber 40 extends between the hub rear 16 and hub front 20 and is bounded by a hub interior wall 46. The hub rearward opening 42 is positioned at the hub rear 16, while the hub forward opening 44 is positioned at the hub front 20. For purposes of the present description, the terms "rear" or "rearward" are used to define a relative position more proximal to the axle and the terms "front" or "forward" are used to define a relative position more distal from the axle.

The hub chamber 40 houses a threaded forward end 48 of the spindle 14, which extends through the hub rearward opening 42, into the hub chamber 40, and partially out the hub chamber 40 via the hub forward opening 44 without engaging the hub interior wall 46. The hub chamber 40 further houses a rearward wheel bearing 50, which is positioned between the hub 12 and spindle 14 proximal to the hub rearward opening 42. The hub chamber 40 similarly houses a forward wheel bearing 52, which is positioned between the hub 12 and spindle 14 proximal to the hub forward opening 44. The rearward and forward wheel bearings 50, 52 are conventional bearings, which engage the hub interior wall 46 and the spindle forward end 48 to provide a friction-reduced rotation surface between the hub 12 and spindle 14 as the hub 12 rotates about the spindle 14. A spindle nut 54 is threadably coupled with the spindle forward end 48 to maintain the positional relationship between the hub 12, spindle 14, and wheel bearings 50, 52 within the hub chamber 40.

The hub rearward opening 42 has a circular perimeter of a fixed inside diameter. The inside diameter of the hub rearward opening 42 is substantially greater than the outside diameter of the spindle 14 adjacent the hub rearward opening 42 to provide a rearward annulus 56 between the hub 12 and spindle 14. The rearward annulus 56 is plugged by a fluid-tight rearward seal 58 positioned in the rearward annulus 56. The rearward seal 58 has a toroidal configuration, which conforms to the contours of the hub rearward opening 42 and the spindle 14. The rearward seal 58 is preferably fabricated from an elastomeric material, which prevents fluid leakage into or out of the hub chamber 40 via the hub rearward opening 42.

The hub forward opening 44 likewise has a circular perimeter of a fixed inside diameter, which is substantially greater than the outside diameter of the spindle forward end 48 adjacent the hub forward opening 44 and is also substantially greater than the outside diameter of the spindle nut 54. Both the spindle forward end 48 and spindle nut 54 extend forward out of the hub chamber 40 via the hub forward opening 44 without engaging the hub interior wall 46 or the perimeter of the hub forward opening 44. The hub forward opening 44 has an inside face 60 with a relatively smooth unthreaded surface.

The coupler 22 has a tubular configuration, which defines a coupler chamber 62, a coupler rearward opening 64, and a coupler forward opening 66. The coupler chamber 62 is open at both ends, extending between the coupler rearward opening 64 and the coupling forward opening 66. The coupler chamber 62 has a uniform inside diameter, which is essentially equal to the inside diameters of the coupler rearward opening 64 and coupler forward opening 66, respectively. The inside diameter of the coupler forward opening 66 is substantially greater than the outside diameter of the spindle forward end 48 adjacent the coupler forward opening 66 and is also substantially greater than the outside diameter of the spindle nut 54. Both the spindle forward end 48 and spindle nut 54 extend into the coupler chamber 62 via the coupler rearward opening 64 without engaging the coupler interior wall 68 or the perimeter of the coupler forward opening 66.

The coupler 22 has a coupler exterior wall 70, which is encircled by a coupler flange 72 approximately midway between the coupler rearward opening 64 and the coupler forward opening 66. The coupler flange 72 segments the coupler exterior wall 70 into a coupler rearward segment 74 and a coupler forward segment 76. The coupler forward segment 76 is provided with male threads 78 on its surface and has a fixed outside diameter. In contrast, the coupler rearward segment 74 has a relatively smooth unthreaded surface and a fixed outside diameter, which is approximately equal to the inside diameter of the hub forward opening 44. The approximately equal diameters of the coupler rearward segment 74 and hub forward opening 44 enable fluid-tight fixable coupling of the coupler 22 with the hub 12 by press fitting the coupler rearward segment 74 into the hub forward opening 44 until the rearward edge 79 of the coupler flange 72 engages the perimeter the hub forward opening 44. The rearward edge 79 is preferably beveled to facilitate removal of the coupler rearward segment 74 from the hub forward opening 44, if desired.

The materials of the hub 12 and coupler 22 are of sufficient strength that a substantial force can be employed by mechanical means to press fit the coupler rearward segment 74 into the hub forward opening 44, thereby ensuring a fluid-tight seal between the coupler rearward segment 74 and hub forward opening 44 without damaging the hub 12 or coupler 22. Furthermore, there is no operational need for periodic removal of the coupler 22 from the hub 12 once the coupler 22 has been press fitted into the hub 12 for servicing the lubricant contained within the hub chamber 40. Accordingly, the desirability of a looser fit between the coupler 22 and hub 12 to facilitate removal is obviated in contrast to the requirements of prior art press-fitted bearing caps and hubs.

As disclosed above, the bearing cap 24 is open at the cap rearward end 30, having a cap rearward opening 80, which exposes a cap interior 82. A continuous cap lip 84 encircles the entire perimeter of the cap rearward opening 80. The cap interior 82 is enclosed on the sides by the cap barrel 26 and on the cap forward end 32 by the cap end plate 28. More particularly, the cap interior 82 is bounded on the sides by a cap interior side wall 86 and on the cap forward end 32 by a cap interior end wall 88. The cap interior side wall 86 is provided with female threads 90 on its surface and has a fixed inside diameter, which is approximately equal to the outside diameter of the coupler forward segment 76. The female threads 90 of the bearing cap 24 align with the male threads 78 of the coupler 22, enabling fluid-tight threadable coupling of the bearing cap 24 over the coupler forward opening 66 and coupler forward segment 76. The bearing cap 24 and coupler 22 are sized such that the spindle forward end 48 and spindle nut 54, which extend into the coupler chamber 62, do not interfere with fluid-tight threadable coupling of the bearing cap 24 and coupler 22.

Fluid-tight threadable coupling is preferably effected by tightly screwing the female threads 90 down onto the male threads 78 until the cap lip 84 engages the forward face of the coupler flange 72. An O-ring 92 is optionally positioned around the coupler forward segment 76 against the forward face of the coupler flange 72 to enhance the integrity of the fluid-tight seal at the threads 78, 90.

As disclosed above, the cap plug 36 is preferably press fitted into the cap opening 34. A ridge 94 are provided on the rearward end of the cap plug 36 to facilitate retention of the cap plug 36 in the cap opening 34. The cap plug 36 is selectively removable from the cap opening 34 as desired, and preferably during maintenance of the hub-spindle assembly 10 to add a liquid lubricant to the hub chamber 40 via the cap opening 34. Removing only the cap plug 36 rather than the entire bearing cap 24 to add fresh liquid lubricant to the hub chamber 40 substantially prevents the liquid lubricant already in the hub chamber 40 from escaping via the coupler forward opening 66. Removal of the cap plug 36 is effected by manually prying the cap plug 36 out of the cap opening 34, while replacement of the cap plug 36 is effected by manually press fitting the cap plug 36 back into the cap opening 34.

In contrast, if one desires to drain the liquid lubricant from the hub chamber 40, it is preferable to completely remove the bearing cap 24 from the coupler forward opening 66. Removal of the bearing cap 24 is effected simply by manually unscrewing the bearing cap 24 and draining the liquid lubricant from the hub chamber 40 via the coupler forward opening 66. Replacement of the bearing cap 24 over the forward opening 66 is effected simply by manually screwing the bearing cap 24 back on.

The pressure vent port 38 forwardly tapers from a wide mouth to a pin hole where the pressure vent port 38 opens into the external environment. The pressure vent port 38 permits hot expanded air to exit the hub chamber 40 during normal operation of the hub-spindle assembly 10. At the same time, the pressure vent port 38 essentially prevents significant leakage of liquid lubricant from the hub chamber 40 via the pressure vent port 38 during normal operation.

When the hub-spindle assembly 10 and cover assembly 18 are cooperatively coupled in the manner disclosed above, the hub chamber 40 and coupler chamber 62 in combination define a substantially continuous lubricant chamber 40, 62. The lubricant chamber 40, 62 has a void volume defined by the portion of the lubricant chamber 40, 62, which is unoccupied by any impermeable structural components, such as the spindle 14, rearward and forward wheel bearings 50, 52, and spindle nut 54. The lubricant chamber 40, 62 is maintained in selective fluid isolation from the external environment of the hub-spindle assembly 10 for purposes of retaining a liquid lubricant therein by positioning the selectively removable bearing cap 24 over the coupler forward opening 66 and positioning the hub rearward seal 58 in the hub rearward opening 42.

The lubricant chamber 40, 62 is specifically adapted for retaining a liquid lubricant therein to lubricate the hub-spindle assembly 10. In a preferred practice, it is only necessary to fill a portion of the void volume of the lubricant chamber 40, 62 with a selected liquid lubricant to effectively lubricate the hub-spindle assembly 10 during operation. A liquid lubricant is generally defined herein as a lubricant which flows under the force of gravity at ambient temperature, whereas a grease lubricant does not flow under the force of gravity at ambient temperature. A preferred liquid lubricant is a conventional petroleum-based lubricant such as a grade SAE 50/95 gear and bearing oil.

It is apparent that the cover assembly of the present invention has particular utility to retrofit applications, wherein an existing grease lubricant-containing hub is converted to a liquid lubricant-containing hub. However, the cover assembly of the present invention is not limited to retrofit applications, but also has utility for original equipment and replacement equipment applications, if desired. Furthermore, the cover assembly of the present invention is not limited to liquid lubricant applications, but also has utility for grease lubricant applications, if desired.

While the forgoing preferred embodiments of the invention have been described and shown, it is understood that alternatives and modifications, such as those suggested and others, may be made thereto and fall within the scope of the invention.

GLOSSARY OF DRAWING TERMS

Attny Docket No. 016P0301
10 hub-spindle assembly
12 hub
14 spindle
16 hub rear (12)
18 cover assembly
20 hub front (12)
22 coupler
24 bearing cap
26 cap barrel (24)
28 cap end plate (24)
30 cap rearward end (26)
32 cap forward end (26)
34 cap opening (24)
36 cap plug
38 vent port (36)
40 hub chamber (12)
42 hub rearward opening (12)
44 hub forward opening (12)
46 hub inferior wall (40)
48 spindle forward end (14)
50 rearward wheel bearing
52 forward wheel bearing
54 spindle nut
56 hub rearward annulus (42)
58 hub rearward seal (56)
60 inside face (44)
62 coupler chamber (22)
64 coupler rearward opening (22)
66 coupler forward opening (22)
68 coupler interior wall (22)
70 coupler exterior wall
72 coupler flange
74 coupler rearward segment
76 coupler forward segment
78 male threads (76)
79 rearward edge (72)
80 rearward opening
82 cap interior
84 cap tip
86 cap interior side wall
88 cap interior end wall
90 female threads (86)
92 O-ring
94 ridge (36)

I claim:

1. A cover assembly for a wheel hub comprising:
a cap having a cap opening, a cap barrel, and a cap end plate, wherein said cap barrel has a first threaded surface; and
a coupler having a coupler forward segment and a coupler rearward segment, wherein said coupler forward segment has a coupler forward opening and a second threaded surface and said coupler rearward segment has a coupler rearward opening, further wherein said coupler rearward segment is configured for connection to a wheel hub and said coupler forward segment is received into said can barrel, thereby selectively engaging said first and second threaded surfaces to threadably connect said cap and said coupler forward segment for selectively removable coverage of said coupler forward opening.

2. The cover assembly of claim 1 wherein said first threaded surface is an internal surface of said cap barrel and said second threaded surface is an external surface of said coupler forward segment.

3. The cover assembly of claim 1 wherein said coupler rearward segment has a smooth engagement surface capable of press fitting connection to the wheel hub.

4. The cover assembly of claim 1 wherein said coupler rearward segment is receivable into the wheel hub.

5. The cover assembly of claim 1 wherein said cap end plate has a cap opening.

6. The cover assembly of claim 5 wherein a selectively removable cap plug is positioned in said cap opening.

7. The cover assembly of claim 1 wherein said coupler forward segment and said coupler rearward segment are separated by a flange.

8. The cover assembly of claim 7 wherein said flange has a beveled edge.

9. A hub-spindle assembly for a rotatable wheel comprising:
   a wheel hub having a hub chamber and a hub forward opening;
   a wheel bearing positioned in said hub chamber;
   a cap having a cap opening, a cap barrel, and a cap end plate, wherein said cap barrel has a first threaded surface; and
   a coupler having a coupler forward segment and a coupler rearward segment, wherein said coupler forward segment has a coupler forward opening and a second threaded surface and said coupler rearward segment has a coupler rearward opening, further wherein said coupler rearward segment is configured for connection to a wheel hub and said coupler forward segment is received into said cap barrel, thereby selectively engaging said first and second threaded surfaces to threadably connect said cap and said coupler forward segment for selectively removable coverage of said coupler forward opening.

10. The hub-spindle assembly of claim 9 wherein said first threaded surface is an internal surface of said cap barrel and said second threaded surface is an external surface of said coupler forward segment.

11. The hub-spindle assembly of claim 9 wherein said coupler rearward segment has a smooth engagement surface for press fitting into said hub chamber via said hub forward opening.

12. A cover assembly for a wheel hub comprising:
   a coupler having a coupler forward segment with a coupler forward opening and a coupler rearward segment with a coupler rearward opening, wherein said coupler rearward segment is configured for connection to a wheel hub; and
   a cap having a cap opening, a cap barrel, and a cap end plate, wherein said coupler forward segment is received into said cap barrel for connection of said cap to said coupler forward segment and for selectively removable coverage of said coupler forward opening.

13. The cover assembly of claim 1 wherein said cap barrel has a first threaded surface and said coupler forward segment has a second threaded surface, further wherein said first and second threaded surfaces are selectively threadably engagable to enable said connection of said cap to said coupler forward segment.

14. The cover assembly of claim 13 wherein said first threaded surface is an internal surface of said cap barrel and said second threaded surface is an external surface of said coupler forward segment.

* * * * *